US007353363B2

(12) United States Patent
Chaudhry et al.

(10) Patent No.: US 7,353,363 B2
(45) Date of Patent: Apr. 1, 2008

(54) PATCHABLE AND/OR PROGRAMMABLE DECODE USING PREDECODE SELECTION

(75) Inventors: Shailender Chaudhry, San Francisco, CA (US); Paul Caprioli, Mountain View, CA (US); Quinn A. Jacobson, Sunnyvale, CA (US); Marc Tremblay, Menlo Park, CA (US)

(73) Assignee: Microsystems, Inc., Santa Clara, CA (US)

( * ) Notice: Subject to any disclaimer, the term of this patent is extended or adjusted under 35 U.S.C. 154(b) by 0 days.

(21) Appl. No.: 11/277,716

(22) Filed: Mar. 28, 2006
(Under 37 CFR 1.47)

(65) Prior Publication Data

US 2007/0226463 A1 Sep. 27, 2007

Related U.S. Application Data

(60) Provisional application No. 60/779,113, filed on Mar. 3, 2006.

(51) Int. Cl.
*G06F 9/44* (2006.01)
(52) U.S. Cl. ....................................... 712/209
(58) Field of Classification Search ................ 712/209, 712/212, 213
See application file for complete search history.

(56) References Cited

U.S. PATENT DOCUMENTS 5,335,331 A * 8/1994 Murao et al. ............... 712/213
5,337,415 A * 8/1994 DeLano et al. ............. 712/213
5,751,982 A * 5/1998 Morley ...................... 712/209
5,796,972 A * 8/1998 Johnson et al. ............ 712/208
5,889,725 A * 3/1999 Aikawa et al. ........ 365/230.06
6,367,006 B1 * 4/2002 Tran ........................... 712/244
6,532,529 B1 * 3/2003 Hongo ....................... 711/220
6,948,053 B2 * 9/2005 Augsburg et al. .......... 712/233
6,952,754 B2 * 10/2005 O'Connor et al. .......... 711/125
2003/0182535 A1 * 9/2003 Kadowaki ................... 712/207

OTHER PUBLICATIONS

U.S. Appl. No. 11/277,735, filed Mar. 28, 2006, and naming as inventor(s) Shailender Chaudhry, Paul Caprioli, Quinn A. Jacobson, and Marc Trembly.
U.S. Appl. No. 11/371,143, filed Mar. 8, 2006, and naming as inventor(s) Shailender Chaudhry, Paul Caprioli, and Sherman Yip.

* cited by examiner

*Primary Examiner*—Eric Coleman
(74) *Attorney, Agent, or Firm*—Gunnison, McKay & Hodgson, L.L.P.; Forrest Gunnison

(57) ABSTRACT

Mechanisms have been developed for providing great flexibility in processor instruction handling, sequencing and execution. In particular, it has been discovered that a configurable predecode mechanism can be employed to select, for respective instruction patterns, between fixed decode and programmable decode paths provided by a processor. In this way, a patchable and/or programmable decode mechanism can be efficiently provided. In some realizations, either (or both) predecode or (and) decode may be configured or reconfigured post-manufacture. In some realizations, either (or both) predecode or (and) decode may be configured at (or about) initialization. In some realizations, either (or both) predecode or (and) decode may be configured at run-time.

16 Claims, 6 Drawing Sheets

PATCHABLE AND/OR PROGRAMMABLE DECODE USING PREDECODE SELECTION

CROSS-REFERENCE TO RELATED APPLICATION(S)

The present application claims priority under 35 U.S.C. § 119(e) of U.S. Provisional Application No. 60/779,113, filed Mar. 3, 2006.

In addition, the present application is related to commonly-owned, co-pending U.S. patent application Ser. No. 11/277,735, entitled "Patchable and/or Programmable Predecode," naming Chaudhry, Caprioli, Jacobson and Tremblay as inventors and filed on even date herewith.

BACKGROUND

1. Field of the Invention

The present invention relates generally to computational systems and, more particularly, to architectural techniques for instruction set processors.

2. Description of the Related Art

Processor architects have long sought to implement instruction set architectures using techniques that need not directly support some instructions in hardware. Indeed, modern processors often provide facilities whereby at least some instructions, when presented in an instruction sequence, are not directly executed but are instead presented to processor logic as operations (or operation sequences) that correspond to instructions defined by an instruction set architecture (ISA). In some cases, such lower-level operations are referred to as microinstructions, μops, helper instructions or simply, microcode.

Indeed, microcoding techniques were commonly used in early IBM mainframe processors to provide a range of implementations of a given instruction set architecture in which functionality corresponding to certain instructions might be supported in lower-end implementations using microcode, whereas higher-end implementations might directly implement the corresponding instructions in hardware. Microprogramming techniques have also been commonly employed in an effort to maintain instruction set compatibility with legacy instruction sets while incorporating advances in computer architecture in the underlying hardware. Superscalar implementations of x86 (or IA-32) instruction set architectures are a prime example of this design technique. In some cases, few (if any) individual instructions (or operations) implemented by the underlying hardware may precisely correspond to actual instruction set instructions. Classic examples include those processor architectures that employ an underlying RISC-style core to implement a CISC-style instruction set. Many commercially-available processors, including those available from Sun Microsystems, Inc., Advanced Micro Devices, Intel, IBM, Motorola, etc. may employ techniques such as described above.

Unfortunately, while microcoding techniques allow a degree of decoupling between underlying hardware mechanisms and the functionality defined by an instruction set that (unlike the underlying hardware) tends to remain vital for multiple generations, many basics aspects of microcoding techniques have remained relatively unchanged for years. Typically, a fixed set of instruction set instructions (including, in some processors, the set of all instruction set instructions) is handled using a microcode store and sequencer. Typically, in those processor implementations in which less than all ISA instructions are microcoded, a given instruction is either directly supported or microcoded and typically either or both the underlying microcode and any mapping of instruction set instructions to microcode is (are) static.

As underlying hardware itself becomes increasingly complex and as concurrent and speculative execution techniques add to this complexity, additional flexibility may be desirable at the interface between instruction set and implementation.

SUMMARY

Mechanisms have been developed for providing great flexibility in processor instruction handling, sequencing and execution. In particular, it has been discovered that a configurable pre-decode mechanism can be employed to select, for respective instruction patterns, between fixed decode and programmable decode paths provided by a processor. In this way, a patchable and/or programmable decode mechanism can be efficiently provided. In some realizations, either (or both) pre-decode or (and) decode may be configured or reconfigured post-manufacture. In some realizations, either (or both) pre-decode or (and) decode may be configured at (or about) initialization. In some realizations, either (or both) pre-decode or (and) decode may be configured at run-time.

By allowing both pre-decode and decode to be configured, we provide an attractive mechanism for fine-grained adaptation (post-manufacture) of instruction sequencing and control. Such capabilities may be particularly attractive in processor architectures that support high levels of concurrency and/or high levels of speculative execution. In such architectures, techniques of the present invention may be employed to patch timing or concurrency hazards or to alter behavior of a pipeline.

For example, pre-decode hints for sequencing, synchronization or speculation control or mappings of ISA instructions to native instructions or operation sequences may be altered. Such techniques may be employed to adapt a processor implementation (in the field) to varying memory models, implementations or interfaces or to varying memory latencies or timing characteristics. Similarly, such techniques may be employed to adapt a processor implementation to correspond to an extended/adapted instruction set architecture. In some realizations, programmable pre-decode may be employed in conjunction with programmable decode to override (for a given instruction pattern) operation of a fixed decode path. In some realizations, instruction decode functionality may be adapted at processor run-time to handle or mitigate a timing, concurrency or speculation issue, e.g., in response to excessive reversion (in a given computation) to checkpointed architectural state or failure and retry of a synchronization construct.

These and other variations will be understood with reference to the specification, drawings and claims that follow.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

The description that follows illustrates certain exemplary realizations of processor architectures in accordance with the present invention. In an effort to provide persons of ordinary skill in the art with a clear description of the invented concepts, we have illustrated these concepts using processor architectures of specific design. In particular, in at least some of our descriptive material, we refer to processor designs that incorporate multi-core designs and/or multiple execution units that may include architectural facilities (including fetch buffers, decode paths, helper arrays, instruction queues, register files, functional units and execution pipelines) replicated on a per-core and/or per-execution pipe basis. In addition, some of our descriptive material is consistent with a particular highly-speculative, highly-pipelined, in-order, multi-core processor design in which extremely large numbers of instructions may be "in flight" at any given time.

In some cases, advantages provided by techniques described herein may be accentuated or of particular significance in such an architecture or implementation. For example, in some cases, silicon area efficiencies afforded by certain exploitations of the invented techniques may provide enhanced benefits in replicated core architectures. Also, in some cases, the potential for unforeseen timing hazards, physically- or temporally-localized power budget excursions, speculation or prediction errors, or instruction sequencing or synchronization bugs in complex highly-concurrent, highly speculative architectures may be managed using techniques of the present invention. For example, in some exploitations, to techniques of the present invention may be used to facilitate post-manufacture patches, configurable operation (e.g., at initialization or boot) and/or event or condition dependent adaptation of processor operation or instruction set architecture.

Nonetheless, techniques of the present invention are more generally applicable. Particular processor architectures illustrated and described are only examples and are in no way critical or essential to any exploitation of the invented techniques. Indeed, applicants envision exploitations and/or adaptations for a wide variety of architectures and/or processor implementations, including for processors of comparatively simple design. Based on the description herein, persons of ordinary skill in the art will appreciate a wide range of exploitations for the invented techniques. Accordingly, particular architectural techniques or advantages are detailed to advance understanding of the invented techniques; however, they do not, in general, constitute a limitation of the range of exploitations that fall within the scope of the appended claims. In view of the above, and without limitation, we now describe certain illustrative embodiments.

Figure 1:
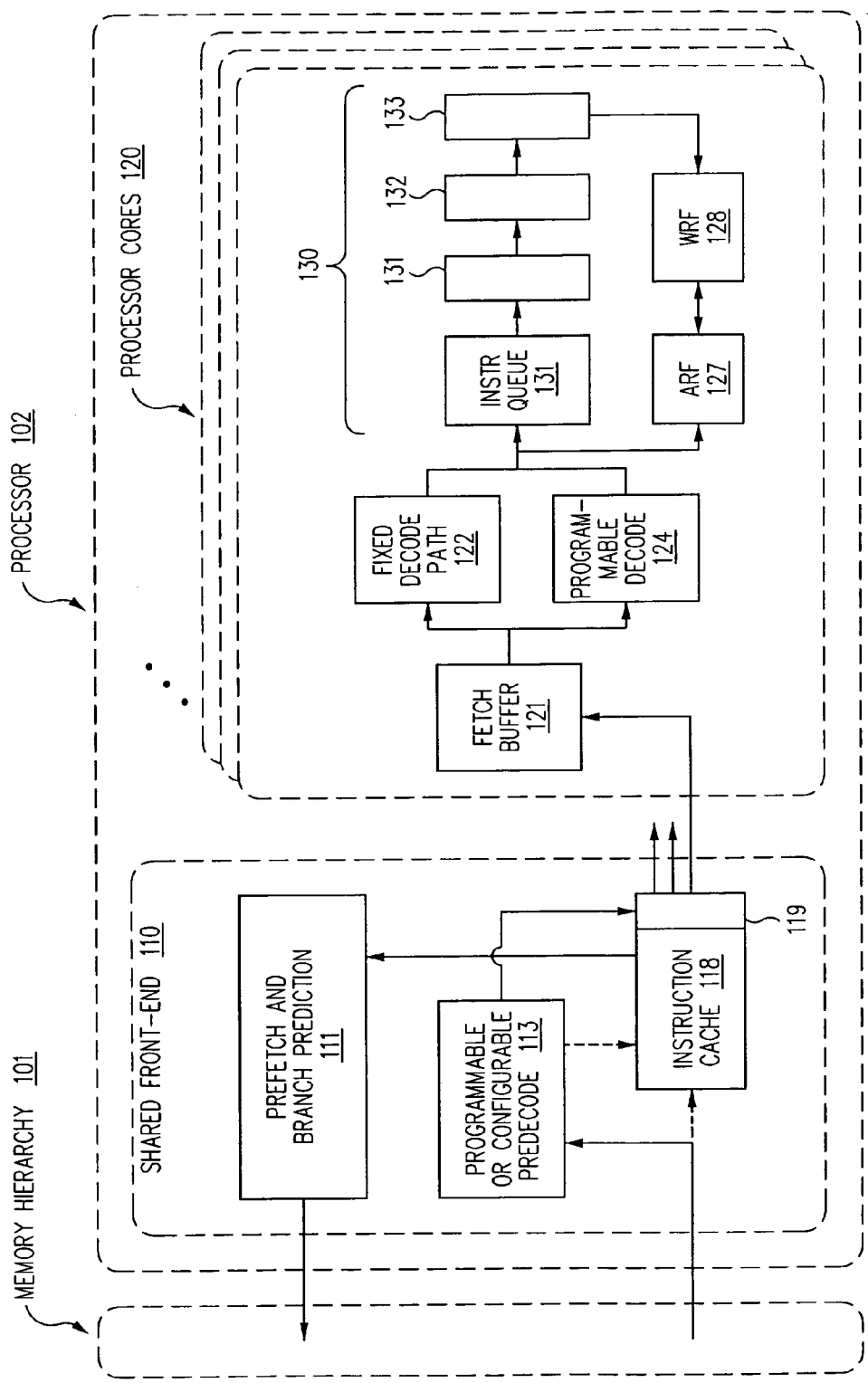
FIG. 1 is a block diagram of an exemplary multicore processor configuration including pre-decode and decode facilities that may be patched and/or updated in accordance with some embodiments of the present invention.

FIG. 1 depicts a multi-core processor in accordance with some embodiments of the present invention. For the sake of simplicity, only a single processor 102 is illustrated. However persons of ordinary skill in the art will recognize that, in many realizations, multiple processors may be provided. Processor 102 interfaces with a hierarchy 101 of memory stores. As is well known in the art, memory hierarchies may include any of a number of levels of cache, main memory, translation buffers, etc. For purposes of the present invention, any suitable memory architecture may be employed, including structures that may be at least partially co-resident on chip with processor structures illustrated.

In the illustrated embodiment, processor 102 includes multiple processor cores that interface with instruction caching, prefetch/branch prediction and pre-decode facilities organized as a shared front end 110. Although multiple cores are illustrated, and some of the techniques of the present invention may provide particular advantage with respect to multi-core processor architectures, persons of ordinary skill the art will recognize based on the description herein, that even single-core processor architectures may benefit from some of the invented techniques. Shared front end 110 includes a programmable or configurable pre-decode block. Pre-decode block 113 processes instructions prefetched from memory hierarchy 101. In general, instructions (typically groups of instructions) are prefetched based on actual and predicted execution paths of instruction sequences executed by functional units, pipelines and/or cores of the processor. Instruction sequencing, prefetch and branch prediction are well understood in the art and, for purposes of the present invention, any of a variety of conventional techniques may be employed.

Various embodiments of programmable or configurable pre-decode block 113 are described in greater detail below. However, in the context of the simplified embodiment illustrated in FIG. 1, pre-decode block 113 operates to pre-decode certain instructions prefetched from memory. As is conventional in pre-decode, instruction patterns in blocks of data prefetched into instruction cache 118 are recognized and initial coding, identification of instruction boundaries (particularly in variable instruction length ISAs) and fields, operands and/or addresses identification is performed. In general, markers or hints may be introduced, alignments updated or enforced or other techniques employed to facilitate efficient downstream decode of individual instructions. Whether prefetched blocks of instructions are introduced directly into instruction cache 118 and annotated/aligned by pre-decode block 113 or arrive at instruction cache 118 via a data flow path through pre-decode block 113 itself is a matter of design choice. In general, pre-decode block 113 associates certain additional information (illustrated conceptually as pre-decode information 119) with instructions introduced into instruction cache 118.

In some realizations that provide patchable and/or programmable decode using pre-decode selection, pre-decode block 113 is advantageously structured to allow pre-decode operations to be configured or even programmed. In this way, pre-decode can introduce into instruction cache 118, pre-decode information useful to downstream decoders to employ a helper sequence in the implementation of certain instructions. In some embodiments, the introduced pre-decode information is selective not only for an alternative decode path, but also for a particular helper sequence or microcode entry point. In some configurations, pre-decode block 113 may provide patchable and/or programmable pre-decode without necessarily requiring a programmable decode facility. In many configurations in accordance with the present invention, both pre-decode block 113 and downstream decoders will provide some level of post-manufacture programmability.

In the multi-core processor configuration illustrated in FIG. 1, each of several processor cores 120 fetch instructions (together with associated pre-decode information) from instruction cache 118. Individual processor cores fetch pre-decoded instructions into respective fetch buffers (e.g., fetch buffer 121) in accordance with an actual or predicted execution sequence of instructions being executed by the core. Although FIG. 1 illustrates in detail only one processor core, persons of ordinary skill in the art will appreciate that multiple cores 120 may also be provided. Typically, other cores will be of similar or identical design. Individual pre-decoded instructions are supplied or retrieved from fetch buffer 121, are decoded and are eventually issued or dispatched to an execution unit of the processor core. Instructions may be speculatively executed in some embodiments.

In the illustration of FIG. 1, alternative decode paths are provided. A fixed decode path 122 includes decode logic of any suitable design for a given instruction set architecture. In addition to the fixed decode path, a programmable decode path 124 including helper store and sequencing mechanism (not separately shown) is also provided, whereby certain instructions of the instruction set architecture (ISA) may be implemented by helper or microcode sequences that correspond to the instruction. In general, any of a variety of helper store designs may be incorporated. In some configurations that provide patchable and/or programmable decode, selection (for a given instruction) of a particular one of the alternative decode paths is based on pre-decode information supplied by pre-decode block 113 and propagated through instruction cache 118 and respective fetch buffer(s) 121 to the decode block of a particular core. In some configurations that provide patchable and/or programmable decode, pre-decode information is selective for a particular helper sequence or microcode entry point.

Sequences of decoded instructions/operations supplied via either fixed decode path 122 or as helper sequences from programmable store included in programmable decode path 124 include operations for execution by functional units of the processor core as well as identifiers for register storage and/or memory addresses to be accessed by such operations. In the illustrated configuration, register identifiers are selective for locations in an architectural state store (e.g., ARF 127) and speculative in-order issue is supported, in part, through the use of working register states (see WRF 128) that are eventually committed to architectural state. Speculative execution techniques are well understood in the art and we need not review them here. Indeed, the predecoder/decoder techniques described herein are more generally applicable to processor implementations without regard to speculation or execution ordering strategy.

In some embodiments in accordance with the present invention, multiple sets of functional units and associated pipelines are provided. For simplicity of illustration, only one such pipeline is illustrated in FIG. 1. However, persons of ordinary skill in the art will recognize that some portions (or all) of pipeline stages 130 may be replicated for respective functional units and pipelines. In the illustrated, and simplified, realization of FIG. 1, an instruction queue 131 buffers instructions that have been decoded (via either decode mechanism) and which may be issued for execution by pipeline stages. Although any of a variety of pipeline designs may be employed, pipeline stages 131, 132 and 133 are illustrative of stages corresponding to issue, execute, and commitment in a modern speculative execution processor architecture. Of course, stages illustrated as a single stage in the simplified illustration of FIG. 1 may correspond to multiple constituent stages in any particular highly-pipelined implementation. Pipeline depth, design and configuration is a matter of design choice and largely independent of the predecode/decode techniques described herein.

In the illustrated processor core, both an architectural and working register file (ARF 127 and WRF 128) are provided. In some embodiments, the architectural register file 127 may be optimized for area and provide a multi-cycle read over a relatively small set of registers accessible in a given register window, whereas the working register file 128, which includes register states not yet committed to the architectural register state, may instead be optimized for speed and provide access to a comparatively larger set of registers. Other register file configurations may, of course, be provided in other implementations. In general selection of an appropriate register file design will be architecture and implementation dependent.

Programmable Pre-Decode

Figure 2:
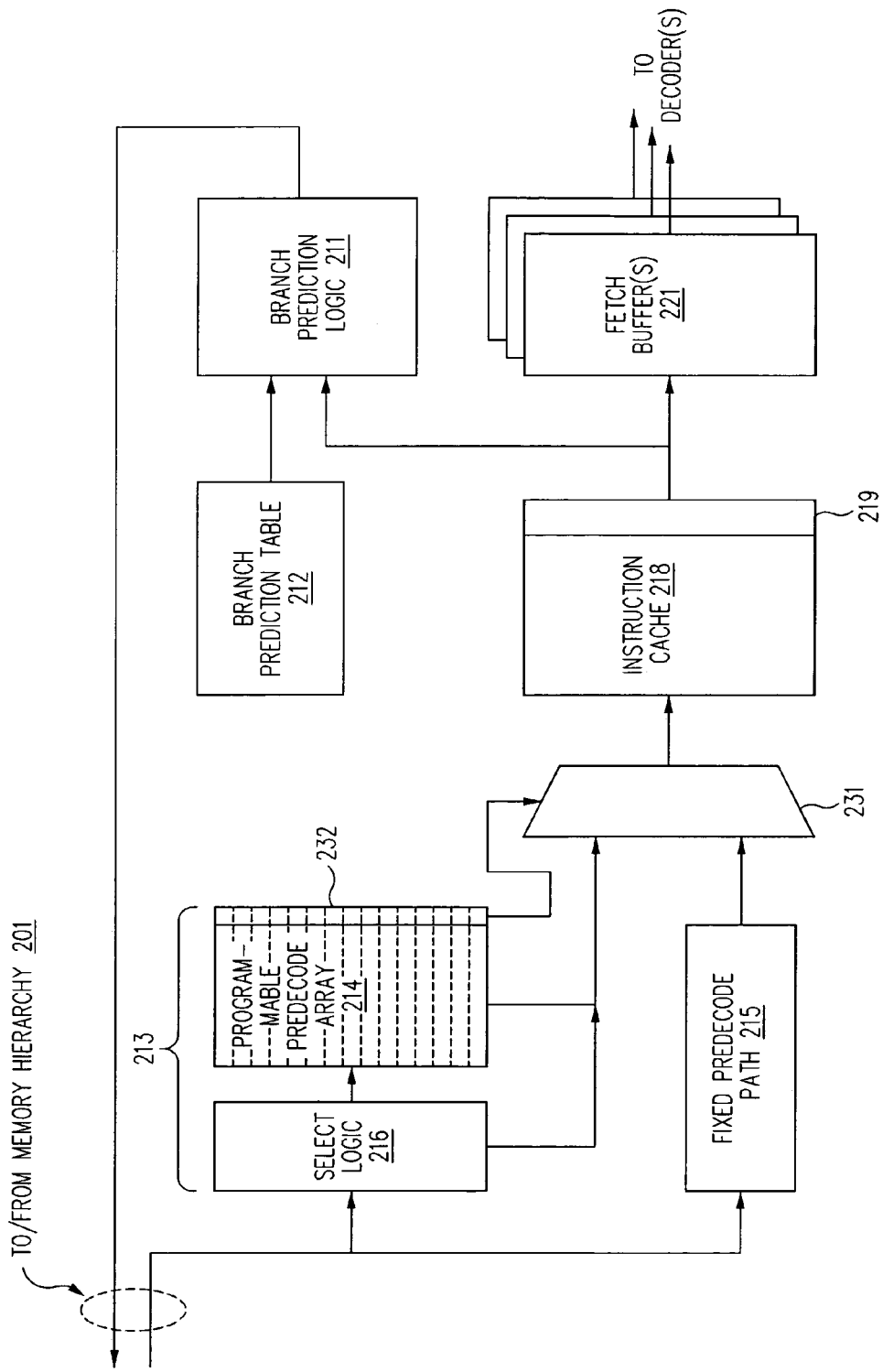
FIG. 2 is a block diagram illustrating a programmable pre-decode facility in accordance with some embodiments of the present invention.

Turning now to the illustration of FIG. 2, we depict portions of a pipeline front end that (in configurations such as illustrated in FIG. 1) may be shared amongst multiple processor cores, or which may be exploited in single-core architectures or in architectures which provide multiple cores in different ways or according to other designs. In particular, we illustrate a programmable pre-decode facility that may be employed with (or without) programmable decode facilities described elsewhere herein. In realizations that include programmable decode facilities, the pre-decode facilities now described provide an attractive mechanism for recognizing instruction patterns for which a patch or functional change is desired, and introducing pre-decode information selective for a fixed or programmable decode path (and in some cases, for a particular helper sequence that implements the patch or functional change). However, it is important to note that some desirable patches and/or functional changes may be introduced without resort to a programmable decode block. Indeed, some potentially desirable post-manufacture changes may be provided entirely through programmable pre-decode. In view of the above, and without limitation, we now describe certain exemplary exploitations of our programmable decode techniques, including exploitations that facilitate programmable decode.

Instructions prefetched from memory (e.g., from memory hierarchy 201) are supplied to two potential pre-decode paths. A fixed pre-decode path 215 is of any of a variety of conventional designs. Typically, fixed pre-decode path 215 is implemented as a combination of combinatorial and steering logic that extracts compactly coded instruction and operand encodings and supplies corresponding codings in which instructions (or opcodes), identifiers for sources and targets, condition codes, etc. are resolved, aligned and/or presented for efficient decode in later stages of a processor pipeline. Often, particularly in ISAs for which instruction field lengths are variable, pre-decode logic identifies instruction and/or field boundaries. In general, the additional increment of information resolved or made explicit through the pre-decode process is referred to herein as pre-decode information.

In FIG. 2, such pre-decode information is illustrated conceptually as pre-decode information 219 and individual elements thereof are associated with instructions or lines represented in instruction cache 218. Of course, persons of ordinary skill in the art will appreciate that any of a variety of pre-decode information codings may be employed in a given exploitation, and FIG. 2 should not be viewed as requiring any particular coding scheme let alone one in which pre-decode information is maintained in any particular separate way from information prefetched from memory.

In addition to the fixed pre-decode path, FIG. 2 illustrates an additional programmable pre-decode path 213. In general, programmable pre-decode path 213 operates upon information prefetched from memory hierarchy 201 and produces (in at least some exploitations or for at least some instruction patterns) information to be supplied into instruction cache 218. Like the fixed decode path, programmable pre-decode path 213 extracts compactly coded instruction and operand encodings and supplies corresponding codings in which instructions (or opcodes), identifiers for sources and targets, condition codes, etc. are resolved, aligned and/or presented for efficient decode in later stages of a processor pipeline. However, unlike fixed decode path 215, the particular operation of programmable pre-decode path 213 is defined (at least in part) using a programmable store such as programmable pre-decode array 214. In general, programmable pre-decode array 214 may include or code particular opcode or field substitutions, temporary register locations, decode hints, exclusive/non-exclusive attributes, blocking/non-blocking attributes, etc. to be used in the information supplied into instruction cache 218.

In the illustrated configuration, select logic 216 indexes into programmable pre-decode array 214, typically based on instruction opcodes extracted from a prefetched cache line, and uses information coded at the indexed entry to generate pre-decoded instructions for supply into instruction cache 218. In general, programmable pre-decode path 213 employs a combination of combinatorial/steering logic (e.g., select logic 216) and array-coded information to generate the pre-decoded instructions. In addition, programmable pre-decode array 214 includes (or has an associated) "use me" coding 232 for entries coded therein that indicates that programmable pre-decode information will be employed for a matching instruction pattern rather than information supplied via fixed pre-decode code path 215. For example, in the illustration of FIG. 2, the associated "use me" coding 232 is supplied to control selection by a multiplexer 231.

Programmable pre-decode array 214 may be programmed in a variety of ways to support any of a variety of programmable decode implementations of greater or lesser sophistication or complexity. For example, information useful in the identification of particular instruction opcodes (or more generally instruction patterns) may be coded in association with codings of expected field/operand lengths or positions, implicit or temporary register targets, field or variant substitutions, decode hints, exclusive/non-exclusive attributes, blocking/non-blocking attributes, etc. In general, pre-decode array 214 may encode programmable pre-decode behavior in any of a variety of ways, ranging from explicit coding of substitutions for each instruction variant to be handled in programmable pre-decode path 213 to more pattern-oriented or data-driven recognition and substitution/transformation codings. Explicit codings will, in general, trade logic simplicity for greater array size, while pattern-oriented/data-driven techniques will, in general, trade reduced array size for increased complexity of match and/or substitution logic.

In some implementations, information selective for a particular downstream decoding strategy (e.g., fixed path decode or helper sequence) may be provided. In some implementations, a particular helper sequence or microcode entry point may even be explicitly coded in programmable pre-decode array 214. Typically, in such configurations, a downstream helper array will also be field programmable to allow great flexibility in post-manufacture alteration of processor behavior for any given instruction code. In multi-core embodiments, this design approach allows a portion of the facilities for instruction set behavior customization to be implemented in a shared-front end and can greatly economize on silicon area that might otherwise be replicated on a per-core basis.

Whatever the particular design for programmable pre-decode path 213 and fixed decode path 215, instructions prefetched from memory hierarchy 201 are supplied into instruction cache 218 together with associated pre-decode information 219. In general, sequencing of prefetch operations is provided by branch prediction logic 211 based on information coded in a branch prediction table 212. In general, branch prediction information is generated based on actual branching behavior of an executing program (or programs). In some realizations, pre-decode information may facilitate or affect operation of the branch prediction logic. For example, pre-decode information may be used to allow or restrict speculative execution of a given instruction instance. Indeed, in some realizations, programmability of pre-decode may provide an attractive mechanism for making post-manufacture (even run-time) modifications to branch prediction behavior.

In the configuration illustrated in FIG. 2, multiple fetch buffers 221 fetch instruction streams from instruction cache 218 to feed their respective decoders and downstream pipeline stages. Of course, other configurations may employ only a single fetch buffer and, notwithstanding specific decoder configurations described below, any of a variety of downstream decoder and execution unit configurations may be employed in conjunction with the illustrated programmable pre-decode techniques. In particular, downstream decoder implementations may or may not be programmable.

The preceding discussion has introduced the concept that pre-decode facilities may themselves be programmable in certain processor implementations in accordance with the present invention. The timing and nature of such programmability is now described with reference to FIG. 3. In general, a variety of triggers or operations may result in initialization, patching or reprogramming of a programmable pre-decode facility such as described above. For example, in some processor architectures, it may be desirable to load and/or update a pre-decode array (such as programmable pre-decode array 214) at or upon processor initialization or coincident with a processor boot sequence. In particular, pre-decode behavior may be specified in a form that may be loaded into a read/write array under control of firmware or a boot control processor. By loading a particular customization of pre-decode behavior on initiation (302) or boot, a processor may be configured for a particular system configuration, memory model, price/performance point, etc. Patches to the processor may be effectuated in essentially the same way, for example by supplying an update to the programmable pre-decode information that directs a processor implementing facilities such as described above, to execute underlying operations that implement a given ISA instruction in a different way.

Suitable update mechanisms will vary based on the particular implementation of programmable pre-decode array 214. In general, any of a variety of field programmable/updatable/swappable non-volatile stores may be employed as programmable pre-decode array 214 itself or as a backing store for information loaded into a volatile or non-volatile store that implements programmable pre-decode array 214. In some realizations, pre-decode array 214 is implemented as volatile memory without a traditional field programmable/updatable/swappable non-volatile backing store. In such realizations pre-decode array 214 can be initialized, as part of the boot sequence, by software. If the machine loses power, the data in the array is lost. That is acceptable since it will be programmed again at the next boot.

In some exploitations, it may be possible to patch (303) around a particular timing or sequencing hazard or bug by identifying the vulnerable instruction set instruction in the pre-decode array, flagging a corresponding instruction pattern as an instruction to be replaced using a helper sequence of operations, and identifying a corresponding entry point in a helper array to be employed by downstream decode facilities. In other situations, less dramatic modifications to pre-decode functionality may be appropriate. For example, it may be desirable to simply alter (post-manufacture) the pre-decode hints supplied in conjunction with a recognized instruction pattern. For example, a processor may be shipped without requiring that a given instruction be executed in a way that precludes concurrent execution of certain competing (or potentially competing) operations. Based on a timing issue identified post-manufacture, it may be desirable to alter behavior of a processor implementation to require that the corresponding instruction be executed without concurrency. Similarly, techniques of the present invention may be exploited to add memory barriers or other synchronization constructs to the implementation of a given instruction set instruction.

While many advantageous exploitations of techniques in accordance with the present invention provide patchable pre-decode and/or decode behavior of a given processor implementation, based on the description here in persons of ordinary skill in the art will further appreciate that modifications to pre-decode and/or decode behavior may also be based on conditions (304) detected during the execution of programs on the processor. For example, in certain execution sequences, an execution path speculatively followed may turn out to be incorrect frequently enough to adversely affect overall performance. In such circumstances, it may be desirable to transition to a more conservative prefetch and/or speculative execution model. Run-time update to pre-decode behavior offers an attractive mechanism to achieve this goal.

Alternatively, optimistic synchronization primitives may result in an inordinate number of retries or reversions to checkpointed state in a particular program or under particular load/concurrency conditions. In such cases, it may be desirable to alter at the execution behavior of the processor, at least temporarily, to avoid unnecessary reexecution of instruction sequences. Again, run-time alteration of pre-decode behavior provides an attractive mechanism for varying the optimism/conservatism of an execution model, e.g., by dynamically introducing or enforcing memory barriers or locking conditions for certain instructions. In other configurations, it may be desirable to employ programmable pre-decode and/or decode facilities to effectuate a power throttling response to an overtemperature indication or dI/dt excursion. By conditionally introducing noops into corresponding operation sequences implementing certain instruction set instructions, it may be possible to reduce power dissipation at the expense of effective instruction bandwidth.

Figure 3:
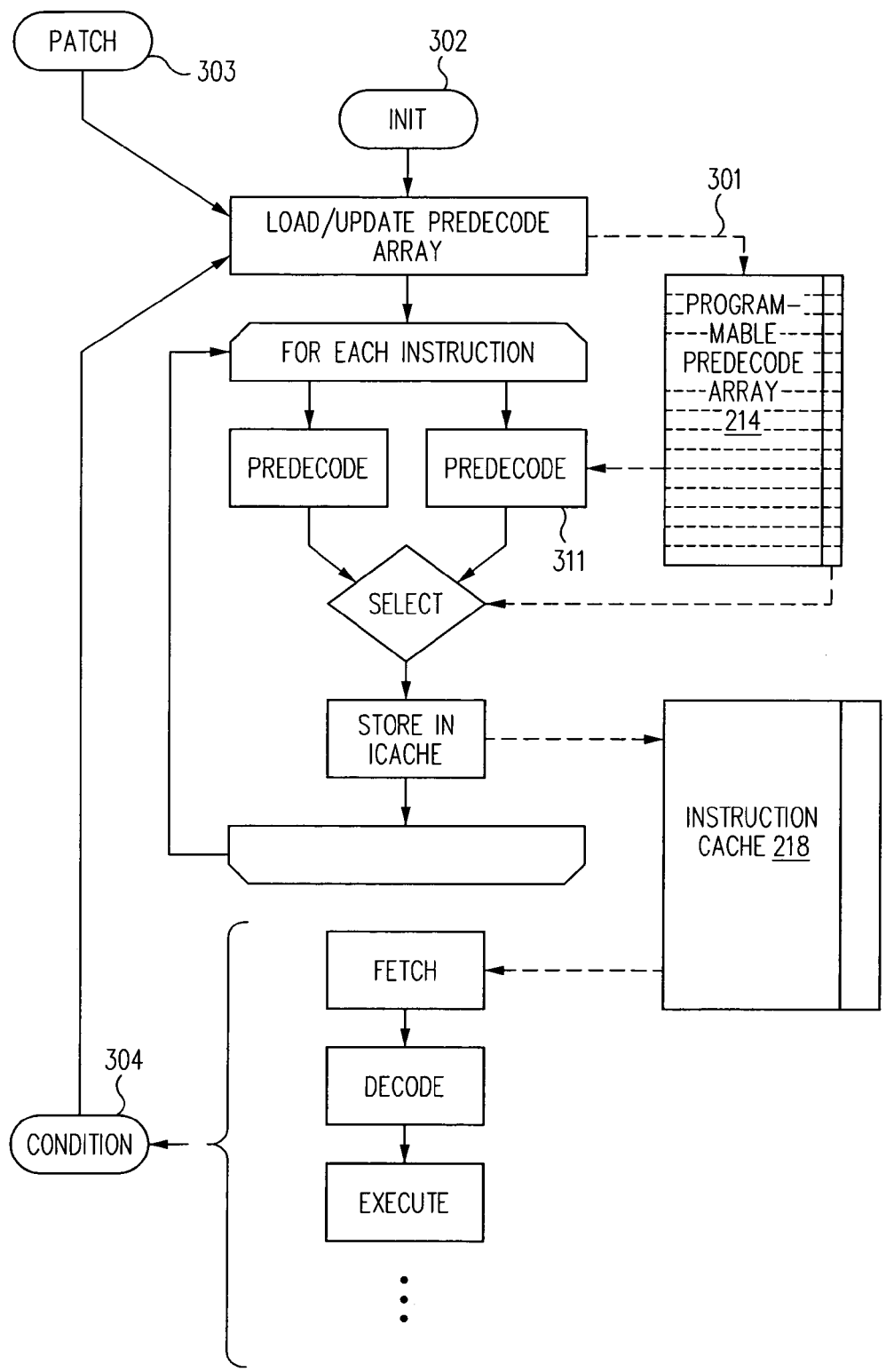
FIG. 3 is a flowchart illustrating update of a programmable pre-decode array in accordance with some embodiments of the present invention.

FIG. 3 illustrates a number of circumstances in which the programmable pre-decode facility described above may be exploited. In general, programmable pre-decode array 214, may be updated (301) upon initialization (302), to effectuate a patch (303), or in response to a detected execution condition (304). By altering the pre-decode behavior of the processor implementation to use programmed pre-decode (rather than fixed pre-decode) and/or, in some cases, to identify helper sequences that may themselves be programmed, techniques of the present invention may be employed to dramatically improve the patchability and/or field programmability of a given processor implementation. Information coded in programmable pre-decode array 214 at least partially defines the behavior of a pre-decode path 311. Using a selection indicator coded in the pre-decode array, a particular pre-decode path is selected and results of the pre-decode (either fixed or programmable) are supplied into instruction cache 218. From there, instructions are fetched, decoded and executed in accordance with the particular processor implementation.

Programmable Decode Based on Pre-Decode Selection of Decode Path

As described above, in some exploitations of our techniques, a programmable pre-decode facility is provided. While the programmability of the pre-decode facility is by itself an advantageous design feature, it will be understood based on the description that follows, that by providing a programmable pre-decode facility (or even a pre-decode facility that is merely configurable post manufacture to select, for a given instruction pattern, decode via a downstream decode facility that is itself programmable), it is possible to conveniently and efficiently provide a processor implementation in which instruction set behavior is patchable and/or programmable. For example, it may be desirable to provide in the programmable pre-decode information that matches a given instruction set pattern, an identification of a helper sequence entry point that can be employed by a downstream decoder mechanism to select an appropriate helper or microcode sequence corresponding to the pre-decoded instruction. In this way, information introduced or added at the pre-decode stage is selective for a decode strategy employed later in a processor pipeline.

Figure 4:
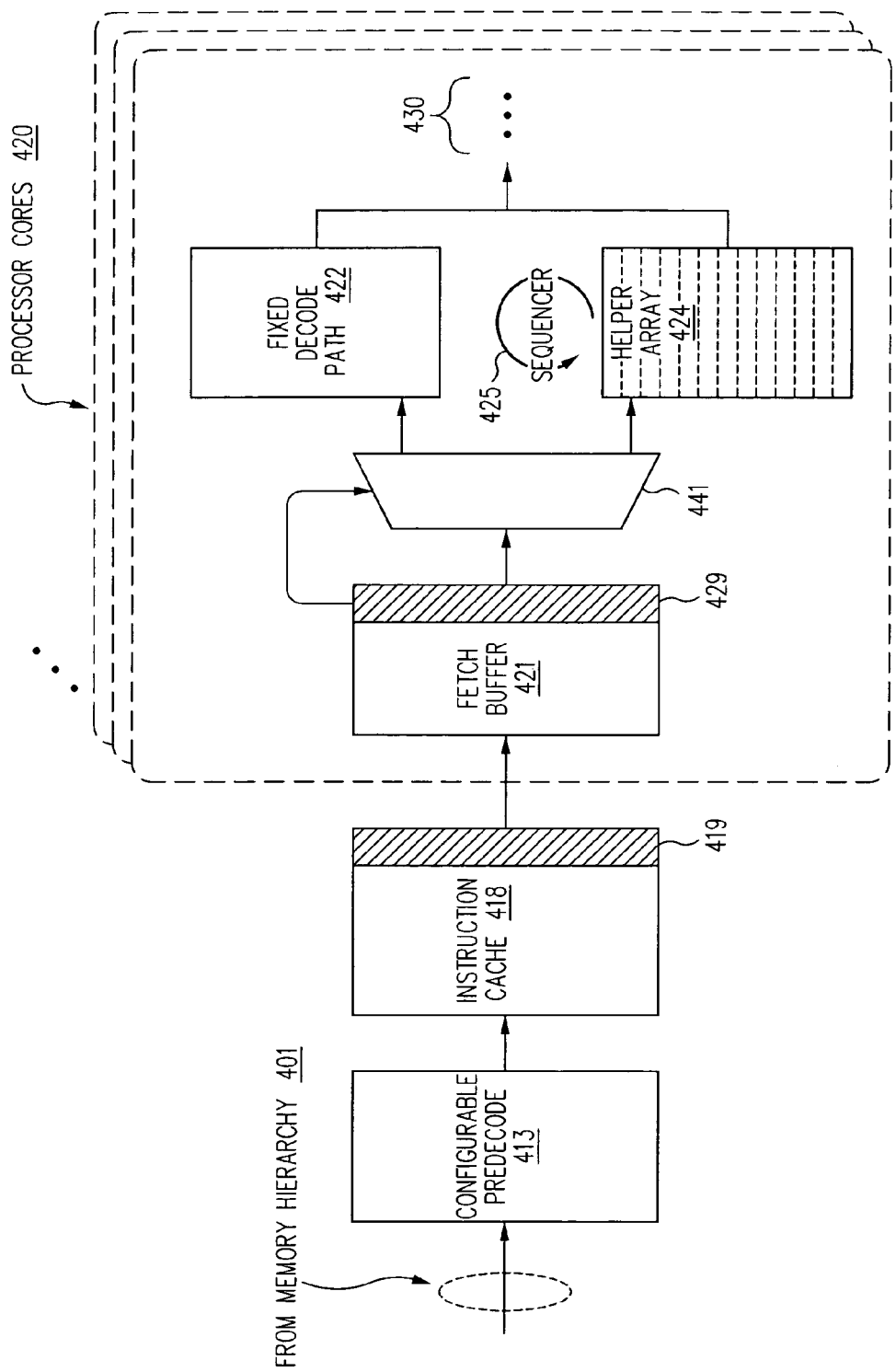
FIG. 4 is a block diagram illustrating a programmable decode facility in accordance with some embodiments of the present invention in which selection of either a fixed decode path or operation sequences from a helper array is based on information introduced into an instruction stream by a configurable pre-decode facility.

We have previously described a programmable pre-decode technique that may be employed in certain exploitations of the present invention. We now turn to programmable decode behavior that may optionally be provided in some embodiments. While some exploitations may advantageously provide programmability of both pre-decode and decode facilities, both are not necessary to all embodiments. In particular, it is important to note that while programmability of decode is desirable, certain exploitations do not rely on any general programmability of pre-decode operation. Accordingly, the illustration of FIG. 4 shows a pre-decode facility that need only be configurable post-manufacture to select decode that is itself programmable. For example, consider an implementation of pre-decode block 413 that provides a laser ablatable connection or antifuse by which behavior is irreversibly altered to introduce, for instructions corresponding to a particular instruction pattern, an indication selective for helper array decode (rather than fixed decode). Of course, other exploitations may provide more sophisticated configurability, including (in some cases) a pre-decode block (such as described in detail above) that provides programmable handling of at least selected instruction patterns.

In the configuration illustrated in FIG. 4, instruction bearing cache lines are prefetched from relevant stores (e.g., from memory hierarchy 401) under control of any suitable prefetch sequencing mechanism or technique (not specifically shown), pre-decoded and supplied into an instruction cache 418 from which they are fetched in accordance with one or more program execution sequences. As before, we have illustrated the possibility that multiple processor cores 420 may fetch from a shared instruction cache 418. Of course, single-core architectures are also contemplated.

Configurable pre-decode block 413 pre-decodes prefetched instructions using any suitable technique, including fixed logic and/or programmable pre-decode techniques described above. As before, information (e.g., field/operand lengths or positions, implicit or temporary register targets, field or variant substitutions, decode hints, exclusive/non-exclusive attributes, blocking/non-blocking attributes, etc.) introduced by operation of pre-decode block 413 is illustrated notionally as associated pre-decode information 419, although such information need not be segregated from raw cache line data in practice. In the illustrated configuration, associated pre-decode information 419 further includes information that indicates (for a particular associated instruction or instructions) that decode is to be performed using programmable, rather than fixed, decode.

In some realizations, the pre-decode information selective for programmable decode identifies a particular helper sequence or microcode entry point. In some realizations, the pre-decode information selective for programmable decode simply indicates that the associated instruction (or instructions) should be decoded using information from a helper array (or microcode store) and selection of the particular sequence is possible (at the decoder) using other information such as the supplied opcode.

Pre-decode information 419 is supplied into instruction cache 418 based on operation of configurable pre-decode block 413. When individual instructions are fetched into fetch buffer 421, those instructions include (in association therewith) at least some of that pre-decode information (shown notionally as pre-decode information 429) which is, in turn, used to select 441 between fixed decode path 422 and operations supplied from the helper array 424. Downstream pipeline stages 430 (e.g., for issue, execution and commitment) are of any suitable design.

In general, helper array 424 and any associated sequencer 425, may be patterned on any of a number of conventional designs. Suitable implementations of helper arrays and other stores of µops, transcoded instructions or microcode are well known in the art and the invented concepts are largely independent of any particular design. Of course, a data path and mechanism for update of the underlying array or store should be provided. In some embodiments, helper arrays and/or programmable pre-decode arrays (if used) may be updated under control of privileged code executing on the processor itself. In other embodiments, auxiliary busses or other data paths (including scan logic) may be employed by an auxiliary (or boot) processor or other system instruction facility. In any case, unlike conventional exploitations of helper or microprogramming designs, alternative fixed and programmable decode paths are provided and selection between the fixed and programmable decode paths is based on information supplied by a configurable pre-decode facility.

Our design approach has several advantages. For example, in comparison with approaches in which all instruction set operations are decoded with resort to a helper or microcode store, patches and/or updates can be limited (using our techniques) to only those instructions for which a change is desired. Since some (indeed most) instructions are decoded using fixed decode path 422, the size of helper array 424 can be limited. In particular, helper array 424 need only accommodate helper sequences those instructions patched and/or originally implemented using helper sequences. Since at least some of the contemplated exploitations replicate any helper array on a per-core basis, reductions in the overall size of helper array 424, silicon footprint for each core may be reduced accordingly.

Note that, in embodiments in which a generally programmable pre-decode facility is provided (e.g., as described above), many patches, updates and/or feature modifications may be supported entirely by changes in pre-decode behavior. For example, pre-decode can cause an alternate native instruction to be employed in the implementation of a particular instruction set instruction. Speculation or memory access modes may be modified or assignments of temporary registers changed. As a result, such patches and/or updates need not require entries in helper array 424.

On the other hand, as mentioned above, in some embodiments, fully programmable pre-decode need not be provided to effectuate the patchable and/or programmable decode facility described with reference to FIG. 4. Instead, a pre-decode facility that merely identifies a given instruction pattern as replaceable using a given helper sequence may be suitable. In some such cases, it may be suitable or desirable to flash program an opcode match table or update machine specific registers accessible to the pre-decode logic to identify particular opcodes subject to helper sequence override and thereby sufficiently configure behavior of the pre-decode logic. Any of a variety of alternative post-manufacture device or circuit configuration techniques may be employed such as laser programming, antifuse technology, etc.

Figure 5:
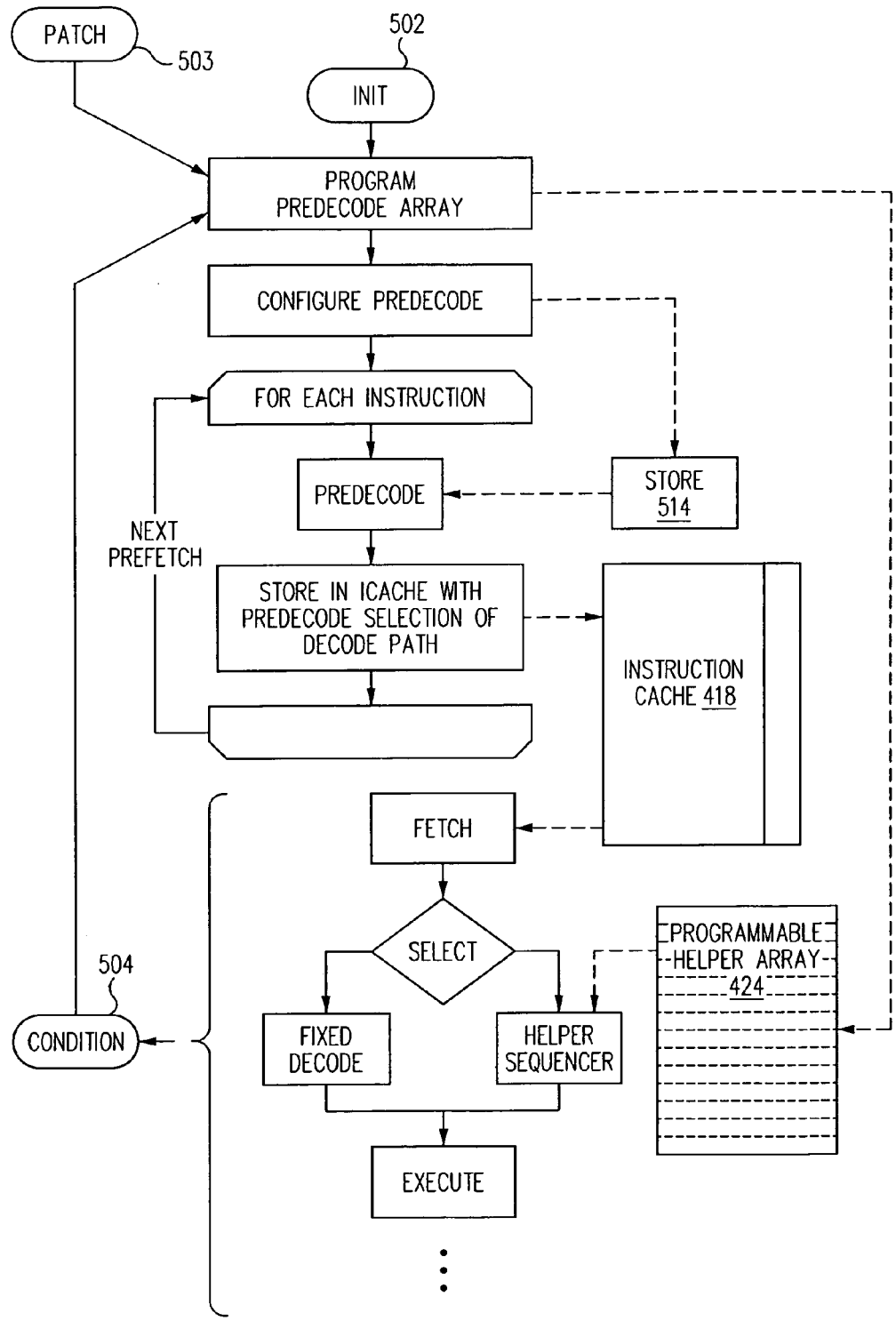
FIG. 5 is a flowchart illustrating update of a programmable helper array in accordance with some embodiments of the present invention and selection, based on a configurable pre-decode block, of selected sequences from the helper array based on an updated pre-decode configuration.

FIG. 5 builds on the previous description and shows how, in some embodiments in accordance with the present invention, a helper array such as helper array 424 may be programmed and pre-decode facilities in a front end may be configured to cause decode stage selection of the programmed helper sequence. As before, alteration of processor behavior may be performed on initialization (502), as a result of the patch (503), or in response to an execution condition (504).

In general, a variety of triggers or operations may result in initialization, patching or reprogramming of the programmable decode facility and configuration of the pre-decode facility for selection of the updated decode functionality. For example, in some processor architectures, it may be desirable to load and/or update a decode array (such as programmable helper array 424) and to make a corresponding configuration update to pre-decode store 514 at or upon processor initialization or coincident with a processor boot sequence. In some embodiments, either (or both) decode or (and) pre-decode behavior may be specified in a form that may be loaded into a read/write array under control of firmware or a boot control processor. By loading a particular customization on initiation (302) or boot, a processor may be configured for a particular system configuration or memory model. Patches to the processor may be effectuated in essentially the same way, for example by supplying an update to the programmable decode and pre-decode information that directs a processor implementing facilities such as described above, to execute a given ISA instruction in a different way.

As with the pre-decode update facilities previously described, suitable update mechanisms will vary based on the particular implementation of helper array 424. In general, any of a variety of field programmable/updatable/swappable non-volatile stores may be employed as helper array 424 itself or as a backing store for information loaded into a volatile or non-volatile store that implements helper array 424. In some realizations, helper array 424 is implemented as volatile memory without a traditional field programmable/updatable/swappable non-volatile backing store. In such realizations, helper array 424 can be initialized, as part of the boot sequence, by software. If the machine loses power, the data in the array is lost. That is acceptable since it will be programmed again at the next boot.

In some exploitations, it may be possible to patch (303) around a particular timing or sequencing hazard or bug by identifying the vulnerable instruction set instruction in the pre-decode array, flagging a corresponding instruction pattern as an instruction to be replaced using a helper sequence of operations, and identifying a corresponding entry point in a helper array to be employed by downstream decode facilities. Similarly, techniques of the present invention may be exploited to add memory barriers instructions or other synchronization constructs to the helper sequence that implements a given instruction set instruction.

While many advantageous exploitations of techniques in accordance with the present invention provide patchable pre-decode and decode behavior of a given processor implementation, based on the description herein persons of ordinary skill in the art will further appreciate that modifications to pre-decode and decode behavior may also be based on conditions (304) detected during the execution of programs on the processor. For example, in certain execution sequences, an execution path speculatively followed may turn out to be incorrect frequently enough to adversely affect overall performance. In such circumstances, it may be desirable to transition to a more conservative speculative execution model. As previously described, it may be desirable to alter at the execution behavior of the processor, at least temporarily, to avoid unnecessary reexecution of instruction sequences. Run-time alteration of pre-decode behavior to select an alternate decode strategy provides an attractive mechanism for varying the optimism/conservatism of an execution model, e.g., by dynamically introducing or enforcing memory barriers or locking conditions for certain instructions. In other configurations, it may be desirable to effectuate a power throttling response to an over-temperature indication or dI/dt excursion. By selecting (e.g., from helper array 424) an alternative decoding that introduces noops into corresponding operation sequences, it may be possible to reduce power dissipation at the expense of effective instruction bandwidth.

Run-time update to pre-decode behavior offers an attractive mechanism to select an alternative decoder implementation for a given instruction set instruction. In some exploitations, an alterative implementation may be already be provided in helper array 424 and need only be selected to achieve the desired change in behavior or operation.

Figure 6:
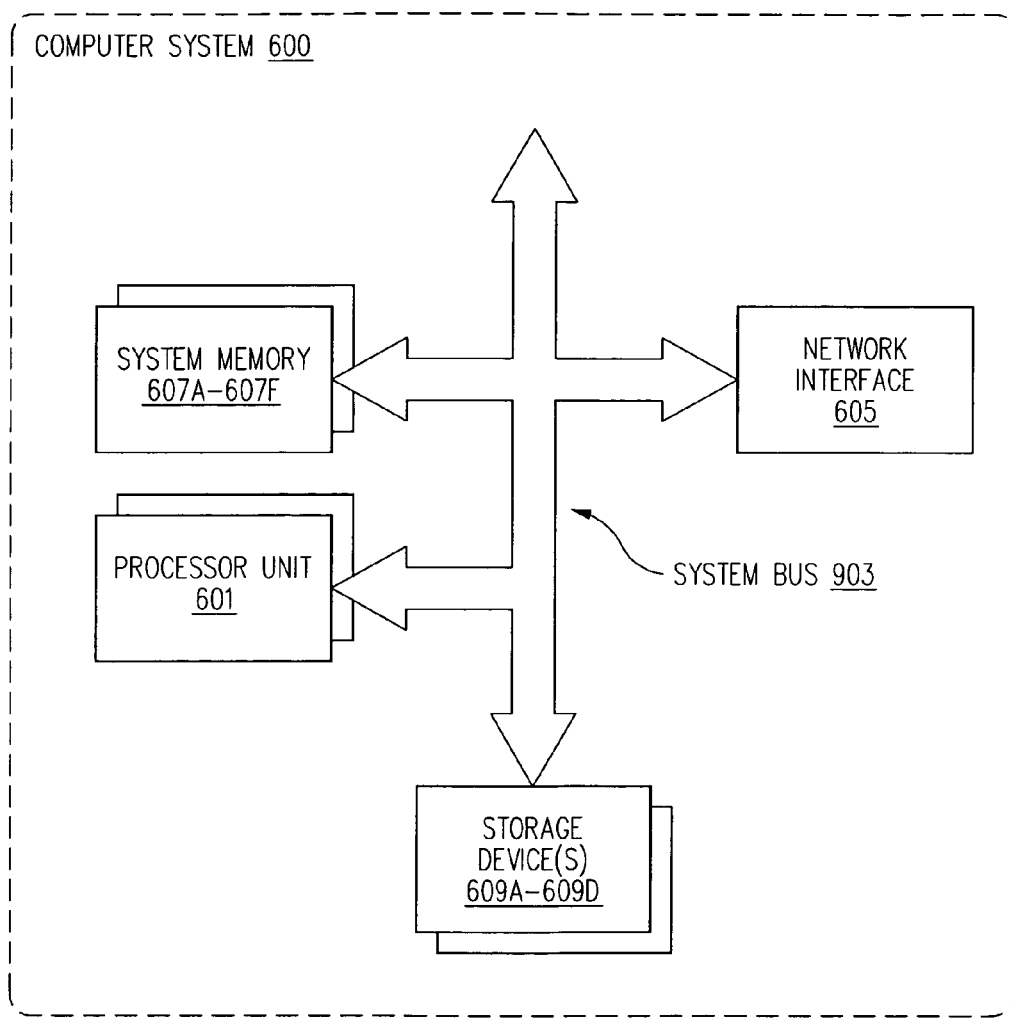
FIG. 6 illustrates block diagram of an exemplary computer system consistent with at least some embodiments of the present invention.

Referring to FIG. 6, an exemplary computer system (e.g., computer system 600) includes a processor unit 601 (possibly including multiple processors, a single threaded processor, a multi-threaded processor, a multi-core processor, etc.). The computer system 600 also includes a system memory 607A-607F (e.g., one or more of cache, SRAM, DRAM, RDRAM, EDO RAM, DDR RAM, EEPROM, or other suitable memory) organized in an suitable configuration or hierarchy, a system bus 603 (e.g., LDT, PCI, ISA, or other suitable interface), a network interface 605 (e.g., an ATM interface, an Ethernet interface, a Frame Relay interface, or other suitable interface), and storage device(s) 609A-609D (e.g., optical storage, magnetic storage, or other suitable storage device). At least some embodiments include fewer or additional components not illustrated in FIG. 6 (e.g., video cards, audio cards, additional network interfaces, peripheral devices, or other components). Processor unit 601, storage device(s) 609A-609D, network interface 605, and system memory 607A-607F are coupled to system bus 603. Processor unit 601 includes pre-decode and/or decode facilities such as described elsewhere herein.

While circuits and physical structures are generally presumed, it is well recognized that in modern semiconductor design and fabrication, physical structures and circuits may be embodied in computer-readable descriptive form suitable for use in subsequent design, test or fabrication stages. Structures and functionality presented as discrete components in the exemplary configurations may be implemented as a combined structure or component. The invention is contemplated to include circuits, systems of circuits, related methods, and computer-readable medium encodings of such circuits, systems, and methods, all as described herein, and as defined in the appended claims. As used herein, a computer-readable medium includes at least disk, tape, or other magnetic, optical, semiconductor (e.g., flash memory cards, ROM). In some cases, encodings may be transmitted using a network, wireline, wireless or other communications medium.

The description of the invention set forth herein is illustrative, and is not intended to limit the scope of the invention as set forth in the following claims. For example, while the invention has been described in an embodiment in which a particular speculative, in-order multi-core architecture is described, one of skill in the art will appreciate that the teachings herein can be utilized with other architectures. Variations and modifications of the embodiments disclosed herein, may be made based on the description set forth herein, without departing from the scope and spirit of the invention as set forth in the following claims.

What is claimed is:

1. A processor comprising:

an instruction decode block including both a fixed decode path and a configurable decode path that includes a programmable multi-entry store from which, for a first subset, less that all, of instructions executed by the processor, programmable sequences of one or more decoded operations are generated;

a predecode path that is configurable to select, for respective instruction patterns, one of the fixed decode path and the configurable decode path wherein said predecode path includes a fixed predecode path and a programmable predecode path wherein each of said fixed predecode path and said programmable predecode path receive a same input; and an instruction store coupled between the configurable predecode path and the instruction decode block, the instruction store including storage for instructions and for predecode information associated with said instructions, wherein said predecode information is received from said predecode path; and at least some of the predecode information is selective for one of the fixed instruction decode path and the configurable instruction decode path.

2. The processor of claim 1, wherein both the configurable predecode path and the configurable decode path are reconfigurable post-manufacture of the processor.

3. The processor of claim 2, wherein either or both the configurable predecode path and the configurable decode path are reconfigurable coincident with initialization of the processor.

4. The processor of claim 2, wherein either or both the configurable predecode path and the configurable decode path are reconfigurable at run-time.

5. The processor of claim 1, wherein the programmable store of the configurable decode path is indexed using predecode information supplied from the configurable predecode path.

6. The processor of claim 1, wherein the configurable predecode path includes a programmable multi-entry store, wherein individual entries thereof correspond to respective instruction patterns and are programmable to encode, for at least some of the instruction patterns, respective identifiers into the programmable store of the configurable decode path.

7. The processor of claim 1, wherein the configurable predecode path includes a programmable multi-entry store, wherein individual entries thereof include codings selective, for at least some programmings and instruction patterns, for one of the fixed decode path and the configurable decode path.

8. The processor of claim 1, further comprising:
replicated fetch-decode paths,
  wherein the instruction store includes a fetch buffer of at least one of the fetch-decode paths.

9. The processor of claim 1, embodied as a computing system and further comprising:
a memory hierarchy coupled to supply the instruction store with instructions for predecode and decode.

10. The processor of claim 1, embodied as one of:
a processor integrated circuit; and
media encoding a design file representation of the processor.

11. A method of operating a processor, the method comprising:
for a given instruction sequence including at least two instruction patterns, decoding at least a first one of said at least two instruction patterns using a fixed decode path and decoding at least a second one of said at least two instruction patterns using a configurable decode path; and
selecting, for a given instruction pattern, either the fixed decode path or the configurable decode path,
wherein the selecting is performed at predecode using a configurable predecode facility having a fixed predecode path and a programmable predecode path wherein each of said fixed predecode path and said programmable predecode path receive a same input.

12. The method of claim 11,
encoding the selection as predecode information.

13. The method of claim 11,
wherein the configurable decode path includes a programmable store; and wherein at least for instructions corresponding to the second instruction pattern, the configurable predecode facility is selective for one or more corresponding entries of the programmable store.

14. The method of claim 11,
executing as part of a single thread of execution, both instructions decoded using the fixed decode path and instructions decoded using the configurable decode path.

15. The method of claim 11, further comprising:
configuring either or both of the configurable predecode facility and the configurable decode path post manufacture, coincident with initialization of the processor, or at run-time.

16. An apparatus comprising:
means for decoding at least a first instruction pattern of an instruction sequence using a fixed decode path;
means for decoding at least a second instruction pattern of the instruction sequence using a configurable decode path; and
means for selecting, for a given instruction pattern, either the fixed decode path or the configurable decode path,
wherein the selecting means includes a configurable predecode means having a fixed predecode means and a programmable predecode means wherein each of said fixed predecode means and said programmable predecode means receive a same input.

* * * * *

UNITED STATES PATENT AND TRADEMARK OFFICE
CERTIFICATE OF CORRECTION

PATENT NO. : 7,353,363 B2 Page 1 of 1
APPLICATION NO. : 11/277716
DATED : April 1, 2008
INVENTOR(S) : Shailender Chaudhry et al.

It is certified that error appears in the above-identified patent and that said Letters Patent is hereby corrected as shown below:

On the title page, after "Assignee:", replace "Microsystems, Inc." with --Sun Microsystems, Inc.--.

In Column 14, Claim 1, Line 50, replace "less that all" with --less than all--.

Signed and Sealed this

First Day of July, 2008

JON W. DUDAS
*Director of the United States Patent and Trademark Office*